July 28, 1931.　　　S. J. BOUGHTON　　　1,815,896
BRAKE CONTROL APPARATUS
Filed July 8, 1926
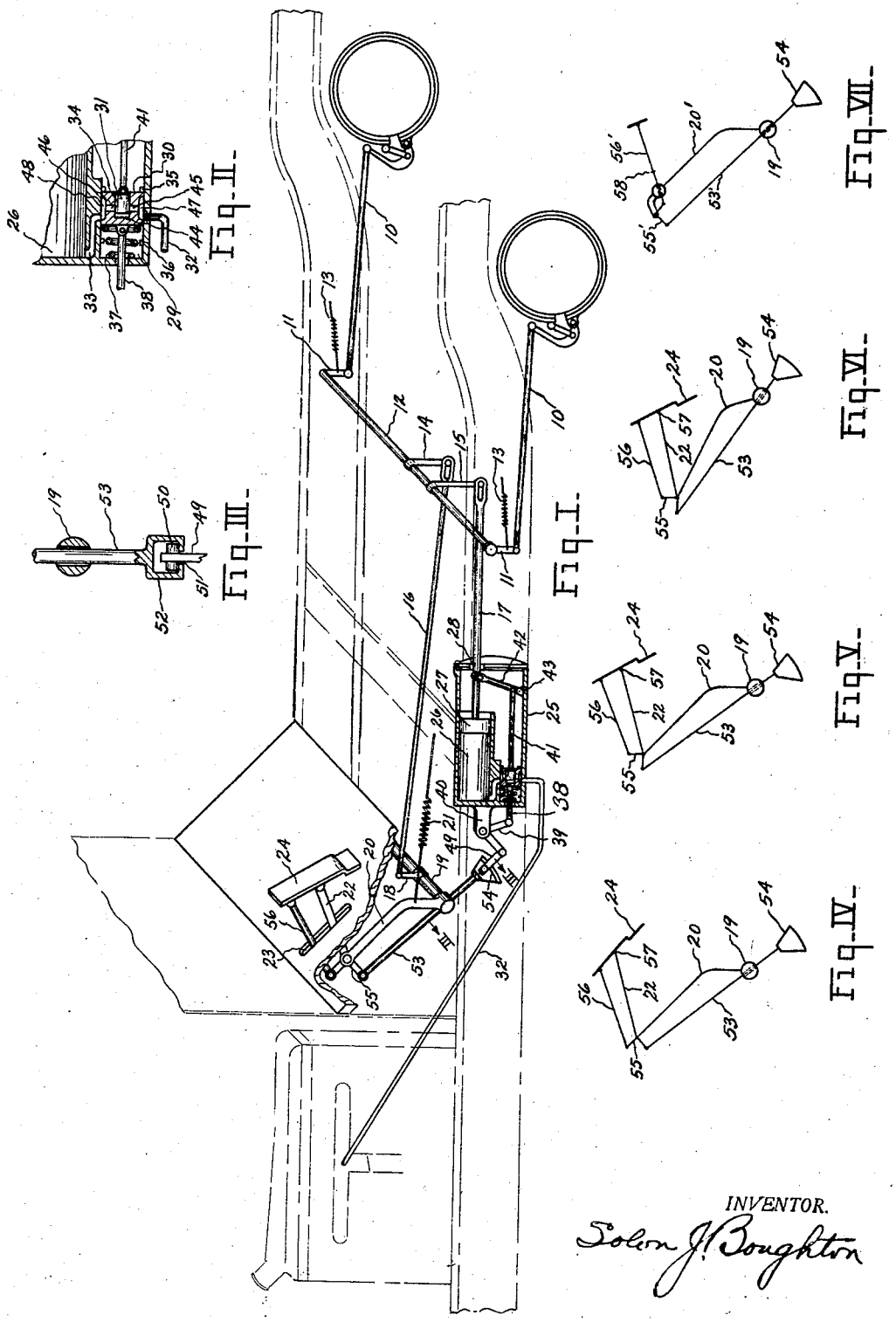
INVENTOR.
Solon J. Boughton Patented July 28, 1931

1,815,896

UNITED STATES PATENT OFFICE

SOLON J. BOUGHTON, OF TOLEDO, OHIO, ASSIGNOR TO THE WILLYS-OVERLAND COMPANY, OF TOLEDO, OHIO, A CORPORATION OF OHIO

BRAKE CONTROL APPARATUS

Application filed July 8, 1926. Serial No. 121,154.

This invention relates to improvements in brake control apparatus, having reference particularly to brakes for automotive vehicles in which is incorporated a servo-motor of any desired type.

One object is the provision of mechanism which will give the operator a sense of the degree of application of the brakes when the servo-motor is used, thus taking the place of the "feel" of the brakes during manual application.

Another object is the provision of control connections for the servo-motor attached to the pedal employed for the manual application of the brakes, and particularly connections of this kind which may be operated independently of the pedal position.

Other objects, and objects relating to details of construction and economies of manufacture, will appear as I proceed with the description of those embodiments of the invention which, for the purposes of the present application, I have illustrated in the accompanying drawings, in which:

Figure I is a view in perspective showing somewhat diagrammatically a brake control mechanism embodying my invention.

Fig. II is a detail, sectional view illustrating a valve mechanism which may be employed to control the admission and exhaust of fluid from the cylinder of the servo-motor.

Fig. III is a fragmental, detail view taken pratly in section upon the line III—III of Fig. I.

Figs. IV, V, and VI are diagrammatic views showing various positions of that part of the control mechanism which is directly attached to the operator's lever.

Fig. VII is a diagrammatic view illustrating a modified form of the mechanism for actuating the valve control.

Similar reference characters refer to like parts throughout the views.

In the drawings, pull rods for the rear brake actuators of an automobile are illustrated at 10, being attached at their forward ends to depending arms 11 which are rigidly mounted upon a rock shaft 12, springs 13 being shown as indicative of any suitable means for releasing the brakes after the force of application is removed. To the shaft 12 there are also secured two other depending arms 14 and 15, joined by lost motion connections with the manual pull rod 16 and the power pull rod 17 respectively. The rod 16 is pivoted at its forward end to a short crank 18 fixed to a rock shaft 19 upon which is secured a lever 20, the movement of which against its retracting spring 21 serves to manually operate the brakes. The lever 20 is preferably provided with a fixed arm 22 projecting through a slot 23 in the toe-board of the automobile with a pedal pad 24 at its upper end in order to permit convenient operation of the lever by foot pressure of the driver.

The servo-motor may be of any known character, the particular type of motor being unimportant so far as this invention is concerned. However, I prefer to employ a motor operated by the suction which is induced in the manifold of an internal combustion engine, as such a motor furnishes an abundance of power whenever the car is in motion, and in any event whenever the engine is running. In the drawings I have shown a casing 25 within which is located a cylinder 26 having a piston 27 to which is attached the pull rod 17, the latter extending through a hole 28 in the casing. Below the cylinder 26, but within the casing, is a valve chamber 29 in which is located a valve mechanism comprising an outer valve piece 30 slidable in the chamber 29 and an inner valve piece 31 slidable in a socket in the outer valve piece 30. A tube 32 forms a fluid tight connection between the engine manifold above the throttle and the valve chamber 29, while there is a further connection 33 in the wall which separates the cylinder 26 and the valve chamber 29. The inner valve piece 31 has a cut-out portion 34 on its upper side, serving in certain positions of the two valve pieces to admit atmospheric air to the passage 33.

Spring means are employed to hold the outer valve piece 30 normally against the stops 35. I prefer to make this spring means such that a greater amount of pressure is required to compress it a given amount when the valve piece 30 approaches its stops 36 than is required to compress it the same amount when the valve piece 30 is near the limit of its motion in the other direction, that is, near the stops 35. This spring means may be so designed and proportioned as to require a progressively greater amount of force for compression to a unit amount as the valve piece 30 moves to the left, this type being the type illustrated at 37 in the drawing.

The valve piece 30 has an operating rod 38 pivoted thereto and extending through an opening in the casing, this rod being in turn pivotally connected to one arm of a bell crank lever 39 which is pivoted to a bracket 40 on the casing. The inner valve piece 31 has pivotally attached thereto an operating rod 41, the opposite end of which is pivoted to an arm 42 swinging from a bracket 43 on the casing 25 and having at its opposite end a pin and slot connection with the pull rod 17. The valve piece 30 has a center socket 44 within which the inner valve piece 31 slides and from this socket there extend in diametrically opposite directions passages 45 and 46 which open into longitudinal grooves 47 and 48 respectively that are arranged to register with the pipe 32 and the passage 33 in all positions of the valve piece.

When the bell crank 39 is operated to move the rod 38 to the left, compressing the spring 37, the valve piece 30 is caused to travel to the left away from the inner valve piece 31 and thus connection is set up between the suction pipe 32 and the passage 33 across the groove 47, passage 45, socket 44, passage 46 and groove 48. Suction being thus permitted to act in the cylinder 26 causes the piston 27 to move to the left and through the arm 15 and rock shaft 12 to operate the brakes. However, the movement of the pull rod 17 to the left carries with it the swinging arm 42, and thus the rod 41 which is attached to the inner valve piece 31, and the motion of the latter to the left follows the motion of the outer valve piece 30 and closes the suction line by breaking connection between the passages 45 and 46. Hence, the degree of movement of the piston 27 is made dependent upon the degree of motion of the rod 38.

In controlling the movement of the rod 38 I prefer to attach it to one arm of a bell crank lever 39, previously referred to, to the other arm of which is pivoted a short link 49 carrying a pin 50 on its upper end. The link 49 extends through a slot 51 in a yoke 52 that is carried at the lower end of a reciprocable rod 53, the yoke having a curved surface 54 against which the pin 50 bears, being held thereto by the tension of the spring 37. The axis of the rod 53 should intersect the axis of the rock shaft 19 and may, if desired, pass through and be guided and supported thereby, as indicated in Fig. III.

In the form of the invention shown in Fig. I, the upper end of the rod 53 is pivoted to one arm of a bell crank lever 55, to the other arm of which is pivoted a link 56 which extends through slot 23 and is pivotally connected to the upper end of pedal pad 24. In this form the pedal pad itself is connected to the lever arm 22 by a transverse hinge, the position of which is indicated at 57 in the diagrammatic views, Figs. IV, V and VI.

In the modification illustrated in Fig. VII the lever 20' carries a bell crank 55' which is arranged to be swung about its pivot by a push rod 56' adapted to be operated by the driver's foot, this push rod having fixed thereon a collar 58 which will engage the lever 20' after the rod 53 has been moved sufficiently to fully actuate the valve piece 30. Thereafter pressure applied to the push rod will turn the rock shaft 19 and operate the brakes manually, assuming that no engine suction is available.

Referring now to Figs. IV, V and VI, Fig. IV shows the parts in their released position. It will be noted that the pedal pad 24 is inclined toward the horizontal considerably, making the two angles between the pad and the lever arm 22 quite unequal. Fig. V shows the parts in the positions they occupy when the servo-motor valve mechanism is actuated to its fullest extent, while the lever 20 remains fixed. In this case the pad 24 is more nearly perpendicular to the arm 22, which is the natural position of the pad when considerable effort is to be exerted to swing the lever 20. Fig. VI shows the parts in the positions of both manual and power application of the brakes. In carrying out this form of the invention the inclination of the pad 24 in the brake released position is such that it is highly improbable that a driver, even in an emergency, will unwittingly fail to use his power brakes, because if he pushes hard on the brake pedal he is almost certain to turn the pad 24 from the position of Fig. IV to that of Fig. VI. In fact, it would be unnatural for him to do otherwise. If deemed desirable, the spring 37 may be made strong enough so that it cannot be fully compressed and full power application obtained until there has been more or less manual effort exerted by the swinging of the lever 20.

The spring 37 is the only detail of the servo-motor which constitutes any part of the present invention, it being understood that this spring could be located elsewhere in the control mechanism without affecting the operation thereof. Furthermore, any one of the various known types of servo-motors might be employed without affecting the invention in this case, and where the words "power cylinder" are employed hereinafter they are to be construed as covering any equivalent such, for instance, as a bellows.

I claim as my invention:

1. In an automotive vehicle, brakes, a medium for applying the brakes, a lever for bringing said medium into operation, a servo-motor, an operative connection between said motor and said medium, valve mechanism for controlling the said motor, and means supported upon said lever embodying an element longitudinally movable in a line passing through the pivotal axis of said lever for operating said valve mechanism.

2. In a control for a servo-motor, a longitudinally movable link mounted to swing about an axis intermediate its ends, valve operating means for said servo-motor, and a connection between said link and said means effective during the longitudinal movement of the link but not affected by the swinging movement thereof.

In testimony whereof I affix my signature.
SOLON J. BOUGHTON.